(No Model.)
D. L. STROUD.
GRAIN CLEANER FOR THRASHING MACHINES.
No. 326,805. Patented Sept. 22, 1885.
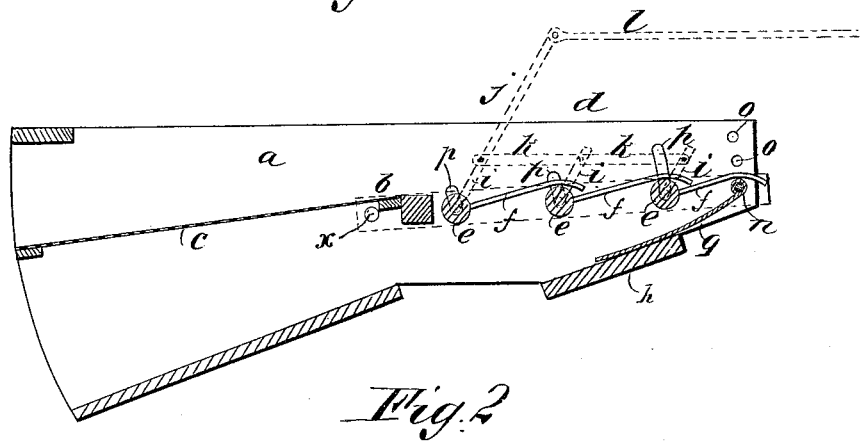
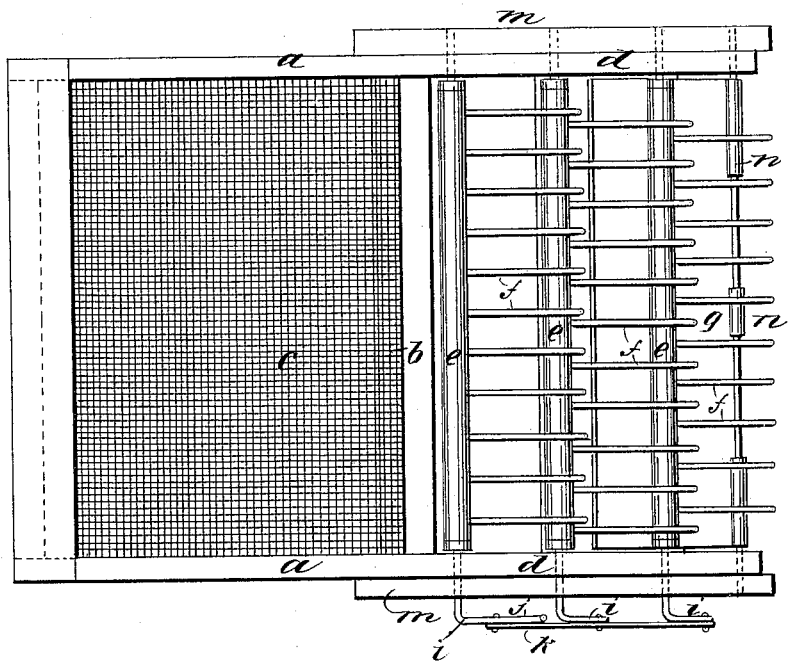
WITNESSES:
INVENTOR:
D. L. Stroud
BY Munn & Co.
ATTORNEYS.

UNITED STATES PATENT OFFICE.

DAVID L. STROUD, OF RICHFORD, MINNESOTA.

GRAIN-CLEANER FOR THRASHING-MACHINES.

SPECIFICATION forming part of Letters Patent No. 326,805, dated September 22, 1885.

Application filed March 5, 1885. (No model.)

*To all whom it may concern:*

Be it known that I, DAVID L. STROUD, of Richford, in the county of Houston and State of Minnesota, have invented certain new and useful Improvements in Grain-Cleaners for Thrashing-Machines, of which the following is a full, clear, and exact description.

My invention consists in the construction and combinations of parts, as will be herein-after fully described and claimed.

Reference is to be had to the accompanying drawings, forming part of this specification, in which similar letters of reference indicate corresponding parts in both the figures.

Figure 1 is a sectional elevation of the shoe of a grain-carrier with my improved separating attachment. Fig. 2 is a plan view of the same.

To the sides $a$ of the sieve-shoe, which usually terminate at the rear ends, $b$, of the sieves, as indicated by the sieve $c$, I add the extensions $d$ of approved length, and arrange a series of rocker-bars, $e$, between them on pivots, and having fingers $f$ ranging from one to the other and overlapping them to form a riddle, over which the straw and chaff escaping from the sieve may pass, to enable such grain as may escape from the sieve along with the straw and chaff to fall away and be received on the chute $h$, to be delivered with the tailings; and to facilitate the separation I contrive the rockers $e$ to be turned forward and backward slightly to impart a rising and falling motion to the fingers $f$, by means of a crank-arm, $i$, attached to each rocker and connected to a rocking lever, $j$, by a bar, $k$, and by the connecting working-lever $j$ to the rod $l$, which is to connect with a crank or any suitable revolving or vibrating shaft, arm, or other suitable working part of the machine for effecting the desired action of the rockers.

The shoe is to be arranged in front of the fan, and so as to receive the grain from the straw-carrier, as the cleaner-shoes of thrashing-machines are commonly arranged, and so as to have the requisite attachments for effecting the side shake common with such devices.

In order that the inclination of the attachment may be varied with relation to the sieve $c$ for different conditions, I mount the rockers in supporting-bars $m$, that are pivoted at $x$, back of the axis of the rocker next to the sieve, in a suitable manner, to swing up thereon, and provide a rod, $n$, for supporting said bars $m$ at any one of a series of holes, $o$, in the sides $d$ of the shoe, said supporting-bars being fitted on the exterior of said sides, with their pivot-rods extending through slots $p$, allowing the rockers to be shifted as required. To this rod $n$, I also attach an auxiliary chute, $q$, with its upper edge resting on said rod, so as to turn freely, and with its lower edge resting on the permanent chute $h$, so as to maintain the desired relations with the separating-fingers in whatever position they may be set. In this example I have represented only one sieve in the shoe; but it is to be understood that any desired number will be employed, as usual.

Having thus described my invention, I claim as new and desire to secure by Letters Patent—

1. The combination of the shoe $a$, having rear extension, $d$, the sieve $c$, the adjustable supports $m$, the rockers having fingers, and the auxiliary chute $q$, adjustable in the shoe to follow the adjustment of the supports $m$, substantially as set forth.

2. The combination of the shoe $a$, having rear extension, $d$, provided with a series of curved slots, $p$, and apertures $o$, the sieve $c$, the supports $m$, pivoted at $x$ to the outside of the shoe, the rockers extending through the curved slots into the supports $m$, fingers $f$ on the rockers, crank-arms $i$, rocking lever $j$, connecting-bar $k$, and the rod $n$, for engaging the holes $o$ to adjust the supports $m$, substantially as set forth.

DAVID L. STROUD.

Witnesses:
BIRD STROUD,
G. W. ROCKWELL.